United States Patent [19]
Scheibli et al.

[11] Patent Number: 4,588,411
[45] Date of Patent: May 13, 1986

[54] LONG-SHELFLIFE PRINT CONTAINING REACTIVE DYE AND ALKALI ACETATE PASTES AND THEIR USE

[75] Inventors: Peter Scheibli, Bottmingen; Alex Känzig, Therwil; Andres Schaub, Biel-Benken, all of Switzerland

[73] Assignee: Ciba-Geigy Corporation, Ardsley, N.Y.

[21] Appl. No.: 679,010

[22] Filed: Dec. 6, 1984

[30] Foreign Application Priority Data

Dec. 8, 1983 [CH] Switzerland ............... 6571/83

[51] Int. Cl.$^4$ ............... C09B 67/00; C09B 67/24; D06P 3/66
[52] U.S. Cl. ............... 8/528; 8/543; 8/549; 8/594; 8/918; 8/527
[58] Field of Search ............... 8/528, 543, 549, 594

[56] References Cited

U.S. PATENT DOCUMENTS

| | | | |
|---|---|---|---|
| 3,150,916 | 9/1964 | Karasconyi et al. | 8/54 |
| 3,770,371 | 11/1973 | Bossard et al. | 8/89 |
| 4,118,184 | 10/1978 | Opitz et al. | 8/527 |
| 4,149,850 | 4/1979 | Schlafer et al. | 8/527 |
| 4,443,224 | 4/1984 | Opitz | 8/527 |

FOREIGN PATENT DOCUMENTS

| | | |
|---|---|---|
| 0058433 | 8/1982 | European Pat. Off. |
| 0066821 | 12/1982 | European Pat. Off. |
| 0127456 | 12/1984 | European Pat. Off. |
| 2340043 | 3/1975 | Fed. Rep. of Germany |
| 3049170 | 10/1981 | Fed. Rep. of Germany |
| 174691/83 | 10/1983 | Japan |
| 886380 | 1/1962 | United Kingdom |
| 886379 | 1/1962 | United Kingdom |

*Primary Examiner*—A. Lionel Clingman
*Attorney, Agent, or Firm*—Wenderoth, Lind & Ponack

[57] ABSTRACT

The invention relates to long-shelflife print pastes containing at least one water-soluble reactive dye of the formula $$D-(X)_m \qquad (1)$$

in which D is the radical of an organic dye of the monoazo, polyazo, metal complex azo, anthraquinone, phthalocyanine, formazan, azomethine, nitroaryl, dioxazine, phenazine or stilbene series, X is a fibre-reactive radical of the aliphatic, aromatic or heterocyclic series which is bonded to the radical D either directly or via a bridge member, and m is 1, 2, 3, 4, 5 or 6, and, per fibre-reactive radical X, at least twice the stoichiometric amount of an alkali metal acetate, and to their use for printing cellulosic fibres.

16 Claims, No Drawings

LONG-SHELFLIFE PRINT CONTAINING REACTIVE DYE AND ALKALI ACETATE PASTES AND THEIR USE

Reactive dyes have become established for printing cellulosic fibre textiles in view of the ever higher fastness demands on the dyes used in the print pastes. Printing with reactive dyes on cellulosic fibres utilises the fairly stable covalent bond of the dyes to the hydroxyl groups of the fibre. Reactive dyes are bonded (fixed) to the fibre in an alkaline medium. The choice of a suitable fixing alkali depends in the main on the reactivity of the reactive dyes used. They are generally fixed with sodium carbonate or sodium hydrogencarbonate or with a mixture of sodium carbonate or sodium hydrogencarbonate and urea in order to obtain adequate degrees of fixation. Print pastes which contain sodium carbonate or sodium hydrogencarbonate with or without urea, however, are felt to be disadvantageous in practice, since many of these print pastes have a short shelflife. The critical factor for the shelflife of a print paste is its pH.

Furthermore, there are existing print pastes for printing cellulose-containing blend fibres, in particular polyester/cellulose blend fabrics, with mixtures of disperse and reactive dyes which contain sodium acetate as fixing alkali and can, if desired, also contain dicyanodiamide or urea. These methods were developed to eliminate any adverse interaction of disperse dyes, dispersants and reactive dyes in the presence of alkali metal salts. It is thought to be a disadvantage of these methods that the choice of possible reactive groups on the reactive dyes is limited.

There is therefore a need for long-shelflife print pastes which contain reactive dyes of middle to high reactivity and a mild fixing alkali and which also permit high degrees of fixation.

It has now been found that the novel print pastes described hereinafter meet these demands.

The present invention accordingly provides long-shelf-life print pastes which contain at least one water-soluble reactive dye of the formula

$$D-(X)_m \qquad (1),$$

in which D is the radical of an organic dye of the monoazo, polyazo, metal complex azo, anthraquinone, phthalocyanine, formazan, azomethine, nitroaryl, dioxazine, phenazine or stilbene series, X is a fibre-reactive radical of the aliphatic, aromatic or heterocyclic series which is bonded to the radical D either directly or via a bridge member, and m is 1, 2, 3, 4, 5 or 6, and, per fibre-reactive radical X, at least twice, in particular at least three times, the stoichiometric amount of an alkali metal acetate.

Surprisingly, the print pastes according to the invention have very good application properties on pure cellulosic fibres without being restricted to certain fibre-reactive groups of the reactive dyes; also surprising are the high degrees of fixation which can be obtained despite the mild fixing alkali. The print pastes according to the invention have a shelflife of several weeks, as required in practice. It is also surprising that the high degrees of fixation of the reactive dyes on cellulosic fibres are only obtained without the otherwise customary presence of urea. It is also surprising that even the indicated minimum amount of fixing alkali is sufficient to obtain high degrees of fixation on cellulosic fibres.

The print pastes according to the invention also contain, as thickening agents, the customary thickeners, in particular alginates, for example sodium alginate, and emulsions or semi-emulsions. Besides these, however, it is also possible to use carob bean flour ether, crystal gum, starch ether, tragacanth and cellulose ether; with the last-mentioned group of compounds there is a danger, in the case of some reactive dyes, that these dyes will react with the thickening agent, thereby rendering the thickening agent insoluble in water and so possibly causing a hardening of the fibre.

The print pastes can also contain, for some reactive dyes, solubilisers, for example ε-caprolactam, thiodiethylene glycol, polyethylene glycol, pentaerythritol, acetin (a mixture of glyceryl monoacetate, diacetate and triacetate) or dicyanodiamide.

The print pastes according to the invention generally also contain additives which are generally customary in print pastes, for example the oxidising agent sodium m-nitrobenzenesulfonate, aqueous formaldehyde solution and water.

The amount of fixing alkali in the print pastes according to the invention depends on the kind and number of fibre-reactive radicals X which contain one or more reactive leaving groups and/or activated double bonds. Reactive leaving groups is to be understood as meaning leaving groups which are suitable for the nucleophilic substitution reaction with the hydroxyl groups of the cellulose in the presence of alkali, for example the halogen atoms of 2,4-difluoro-5-chloropyrimidinyl or 2-fluoro-4-amino-1,3,5-triazinyl reactive radicals. Activated double bond is to be understood as meaning a double bond which is suitable for addition onto the hydroxyl groups of the cellulose, for example the vinylsulfonyl reactive radical. Reactive radicals which react with the fibre in accordance with the nucleophilic addition mechanism frequently go through a preliminary elimination stage, as does for example the β-sulfatoethylsulfonyl or the β-sulfatoethylaminosulfonyl reactive radical in eliminating one equivalent of sulfuric acid. These reactive radicals require a correspondingly greater amount of alkali metal acetate. The minimum amount of alkali metal acetate indicated in the print pastes according to the invention is based on the reaction step leading to the dye-fibre bond.

Particular preference is given to the novel long-shelflife print pastes which contain, per fibre-reactive radical X, twice to five times, in particular at least three times to five times, the stoichiometric amount of alkali metal acetate, for example lithium acetate, in particular potassium acetate and especially sodium acetate.

A suitable upper limit for the ratio of fibre-reactive radical with alkali metal acetate has been found to be six times the stoichiometric amount of alkali metal acetate per fibre-reactive radical X.

Higher alkali metal acetate contents neither produce an even longer shelflife, nor give further improvements in the degrees of fixation which can be achieved.

The invention also relates to the use of the print pastes according to the invention for printing cellulosic fibres which comprises printing the textile material with the long-shelflife print pastes and then fixing the reactive dye.

The dye is fixed on the fibre in conventional manner in which fixing time and fixing temperature depend on the fibre material and the reactivity of the reactive dyes used. To obtain uniform and optimal fixation of dye it is generally sufficient to steam at 100° to 140° C., in particular 100° to 105° C., in saturated steam for between 30 seconds and 12 minutes in particular 2 to 10 minutes. High-temperature steaming and dry-heat treatment take 20 seconds to 8 minutes at 105° to 190° C. to produce adequate fixation.

The prints are completed by rinsing in hot and/or cold water and if desired subsequently washing in the presence of a commercially available detergent, then rinsing in water and drying.

Cellulosic fibres includes natural fibres, such as cotton and linen (bleached), and regenerated fibres, such as viscose, polynosics and cuprammonium rayon. Printing takes place in the main on woven and knitted fabrics produced from these fibres.

In the print pastes according to the invention, the reactive dyes of the formula (1) can contain up to 6 reactive radicals of the same or different types.

Preference is given to long-shelflife print pastes containing at least one water-soluble reactive dye of the formula

[D—(X)$_m$]—(SO$_3$$^\ominus$Ka)$_n$   (2), in which D is the radical of a monoazo or disazo dye or of a metal complex azo, anthraquinone, formazan or dioxazine dye, Ka is a cation, n is 1, 2, 3, 4, 5 or 6, and X and m are as defined under the formula (1). In particular, m is 1 or 2 and, independently thereof, n is 2, 3 or 4.

The water-soluble reactive dyes of the formula (1) can be the dye radicals D given under the formula (1) which contain 1 to 6, in particular up to 2, reactive radicals X.

Fibre-reactive radicals X are to be understood as meaning fibre-reactive radicals which are capable of reacting with the hydroxyl groups of cellulose, the amino, carboxyl, hydroxyl and thiol groups in wool and silk or with the amino and possibly carboxyl groups of nylons to form covalent chemical bonds.

X preferably is a fibre-reactive radical of the aliphatic or heterocyclic series which is bonded to the radical D either directly or via a bridge member.

Preferably X is bonded to the radical D directly or via an amino group, which can be monoalkylated, for example via —NH—, —N(CH$_3$)—, —N(C$_2$H$_5$)—or —N(C$_3$H$_7$)— or via a bridge member containing an amino group.

Examples of what the fibre-reactive radicals X in the formula (1) can be are the following aliphatic and aromatic radicals:

vinylsulfonyl, β-chloroethylsulfonyl, β-sulfatoethylsulfonyl, β-acetoxyethylsulfonyl, phosphonooxyethylsulfonyl, β-thiosulfatoethylsulfonyl, N-methyl-N-(β-sulfatoethylsulfonyl)amino, acryloyl, monochloroacryloyl, dichloroacryloyl or trichloroacryloyl such as —CO—CCl=CH$_2$, —CO—CH=CH—Cl, —CO—CCl=CH—CH$_3$; monobromoacryloyl, dibromoacryloyl or tribromoacryloyl such as —CO—CBr=CH$_2$, —CO—CH=CH—Br, —CO—CBr=CH—CH$_3$; as well as —CO—CCl=CH—COOH, —CO—CH=CCl—COOH, —CO—CBr=CH—COOH, —CO—CH=CBr—COOH; —CO—CCl=CCl—COOH, —CO—CBr=CBr—COOH; precursors of the acryloyl radical and of derivatives of the acryloyl radical such as β-chloropropionyl, β-bromopropionyl, 3-phenylsulfonylpropionyl, 3methylsulfonylpropionyl, 3-chloro-3-phenylsulfonylpropionyl, 2,3-dichloropropionyl, 2,3-dibromopropionyl; as well as 2-fluoro-2-chloro-3,3-difluorocyclobutane-1-carbonyl, 2,2,3,3-tetrafluorocyclobutane-1-carbonyl or -1-sulfonyl, β-(2,2,3,3-tetrafluorocyclobut-1-yl)acryloyl, α- or β-alkenylsulfonylacryloyl or -arylsulfonylacryloyl groups, such as α- or β-methylsulfonylacryloyl, propiolyl, chloroacetyl, bromoacetyl, 4-(β-chloroethylsulfonyl)butyryl, 4-vinylsulfonylbutyryl, 5-(β-chloroethylsulfonyl)valeryl, 5-vinylsulfonylvaleryl, 6-(β-chloroethylsulfonyl)caproyl, 6-vinylsulfonylcaproyl; as well as 4-fluoro-3-nitrobenzoyl, 4-fluoro-3nitrophenylsulfonyl, 4-fluoro-3-methylsulfonylbenzoyl, 4-fluoro-3-cyanobenzoyl, and 2-fluoro-5-methylsulfonylbenzoyl.

Further examples of fibre-reactive radicals X belong to the heterocyclic series, such as 2,4-dichlorotriazin-6-yl, monohalogenopyrimidinyl, dihalogenopyrimidinyl or trihalogenopyrimidinyl radicals, such as 2,4-dichloropyrimidin-6-yl, 2,4,5-trichloropyrimidin-6-yl, 2,4-dichloro-5-nitro or 5-methyl or 5-carboxymethyl- or -5-carboxy- or -5-cyano or -5-vinyl- or -5-sulfo- or -5-monochloromethyl, -dichloromethyl- or trichloromethyl- or 5-methylsulfonyl-6-pyrimidinyl, 2,5-dichloro-4-methylsulfonyl-6-pyrimidinyl, 2-fluoro-4-pyrimidinyl, 2,6-difluoro-4-pyrimidinyl, 2,6-difluoro-5-chloro-4-pyrimidinyl, 2-fluoro-5,6-dichloro-4-pyrimidinyl, 2,6-difluoro-5-methyl-4pyrimidinyl, 2,5-difluoro-6-methyl-4-pyrimidinyl, 2-fluoro-5-methyl-6-chloro-4-pyrimidinyl, 2-fluoro-5-nitro-6-chloro-4-pyrimidinyl, 5-bromo-2-fluoro-4-pyrimidinyl, 2-fluoro-5-cyano-4-pyrimidinyl, 2-fluoro-5-methyl-4-pyrimidinyl, 2,5,6-trifluoro-4-pyrimidinyl, 5-chloro-6-chloromethyl-2-fluoro-4-pyrimidinyl, 2,6-difluoro-5-bromo-4-pyrimidinyl, 2-fluoro-5-bromo-6-chloromethyl-4-pyrimidinyl, 2,6-difluoro-5-chloromethyl-4-pyrimidinyl, 2,6-difluoro-5-nitro-4-pyrimidinyl, 2-fluoro-6-methyl-4-pyrimidinyl, 2-fluoro-5-chloro-6-methyl-4pyrimidinyl, 2-fluoro-5-chloro-4-pyrimidinyl, 2-fluoro-6-chloro-4-pyrimidinyl, 6-trifluoromethyl-5-chloro-2-fluoro-4-pyrimidinyl, 6-trifluoromethyl-2-fluoro-4-pyrimidinyl, 6-trifluoromethyl-2-fluoro-4-pyrimidinyl, 2-fluoro-5-nitro-4-pyrimidinyl, 2-fluoro-5-trifluoromethyl-4-pyrimidinyl, 2-fluoro-5-phenyl- or 5-methylsulfonyl-4-pyrimidinyl, 2-fluoro-5-carboxamido-4-pyrimidinyl, 2-fluoro-5-carbomethoxy-4-pyrimidinyl, 2-fluoro-5-bromo-6-trifluoromethyl-4-pyrimidinyl, 2-fluoro-6-carboxamido-4-pyrimidinyl, 2-fluoro-6-carbomethoxy-4pyrimidinyl, 2-fluoro-6-phenyl-4-pyrimidinyl, 2-fluoro-6-cyano-4-pyrimidinyl, 2,6-difluoro-5-methylsulfonyl-4pyrimidinyl, 2-fluoro-5-sulfonamido-4-pyrimidinyl, 2-fluoro-5-chloro-6-carbomethoxy-4-pyrimidinyl, 2,6-difluoro-5-trifluoromethyl-4-pyrimidinyl; 2,4-bismethylsulfonyl-pyrimidin-4-yl, 2,5-bismethylsulfonyl-5-chloropyrimidin-4-yl, 2-methylsulfonylpyrimidin-4-yl, 2-phenylsulfonylpyrimidin-4-yl, 2-methylsulfonyl-5-chloro-6-methylpyrimidin-4-yl, 2-methylsulfonyl-5-bromo-6-methylpyrimidin-4-yl, 2-methylsulfonyl-5-chloro-6-ethylpyrimidin-4-yl, 2-methylsulfonyl-5-chloromethylpyrimidin-4-yl, 2-methylsulfonyl-5-nitro-6-methylpyrimidin-4-yl, 2,5,6-trismethylsulfonylpyrimidin-4-yl, 2-methylsulfonyl-5,6-dimethylpyrimidin-4-yl, 2-ethylsulfonyl-5-chloro-6-methylpyrimidin-4-yl, 2-methylsulfonyl-6-chloropyrimidin-4-yl, 2,6-bismethylsulfonyl-5-chloropyrimidin-4-yl, 2-methylsulfonyl-6-carboxypyrimidin-4-yl, 2-methylsulfonyl-5-sulfopyrimidin-4-yl, 2-methylsulfonyl-6-carbomethoxypyrimidin-4-yl, 2-methylsulfonyl-5-carboxypyrimidin-4-yl, 2-methylsulfonyl-5-cyano-6-methoxypyrimidin-4-yl, 2-methylsulfonyl-5-chloropyrimidin-4-yl, 2-sulfoethylsulfonyl-6-methylpyrimidin-4-yl, 2-methylsulfonyl-5-bromopyrimidin-4-yl, 2-phenylsulfonyl-5-chloropyrimidin-4-yl, 2-carboxymethylsulfonyl-5-chloro-6-methylpyrimidin-4-yl, 2,4-dichloropyrimidine-6-carbonyl or -6sulfonyl, 2,4-dichloropyrimidine-5-carbonyl or -5-sulfonyl, 2-chloro-4-methylpyrimidine-5-carbonyl, 2-methyl-4-chloropyrimidine-5-carbonyl, 2-methylthio-4-fluoropyrimidine-5-carbonyl, 6-methyl-2,4-dichloropyrimidine-5-carbonyl, 2,4,6-trichloropyrimidine-5-carbonyl, 2,4-dichloropyrimidine-5sulfonyl, 2,4-dichloro-6-methylpyrimidine-5-carbonyl or -5-sulfonyl, 2-methylsulfonyl-6-chloropyrimidine-4- and -5-carbonyl, 2,6-bis(methylsulfonyl)pyrimidine-4- or -5-carbonyl, 2-ethylsulfonyl-6-chloropyrimidine-5-carbonyl, 2,4-bis(methylsulfonyl)pyrimidine-5-sulfonyl, 2-methylsulfonyl-4-chloro-6-methylpyrimidine-5-sulfonyl or -5-carbonyl, 2-chloroquinoxaline-3-carbonyl, 2- or 3-monochloroquinoxaline-6-carbonyl, 2- or 3-monochloroquinoxaline-6-sulfonyl, 2,3-dichloroquinoxaline-5- or -6-carbonyl, 2,3-dichloroquinoxaline-5- or-6-sulfonyl, 1,4-dichlorophthalazine-6-sulfonyl- or -6-carbonyl, 2,4-dichloroquinazoline-7- or -6-sulfonyl or -carbony, 2,4,6-trichloroquinazoline-7- or -8- sulfonyl, 2- or 3- or 4-(4',5'-dichloropyridazon-6'-yl-1')phenylsulfonyl- or -carbonyl, β-(4', 5'-dichloropyridazinone-6'-yl-1')-propionyl, 3,6-dichloropyridazine-4-carbonyl or -4-sulfonyl, 2-chlorobenzothiazole-5- or -6-carbonyl or -5- or -6-sulfonyl, 2-arylsulfonyl- or -alkylsulfonylbenzothiazole-5- or -6-carbonyl- or -5- or -6-sulfonyl, such as 2-methylsulfonylbenzothiazole- or 2-ethylsulfonylbenzothiazole-5- or -6-sulfonyl or -carbonyl, 2-phenylsulfonylbenzothiazole-5- or -6-sulfonyl- or -carbonyl and the corresponding 2-sulfonylbenzothiazole-5- or -6-carbonyl or -sulfonyl derivatives which contain sulfo groups in the fused-on benzene ring, 2-chlorobenzoxazole-5- or -6-carbonyl or -sulfonyl, 2-chlorobenzimidazole-5- or -6-carbonyl- or -sulfonyl, 2-chloro-1-methylbenzimidazole-5- or -6-carbonyl- or -sulfonyl, 2-chloro-4-methylthiazole-(1,3)-5-carbonyl) or -4- or -5-sulfonyl; ammonium-containing triazine rings, such as 2-trimethylammonium-4-phenylamino- or 4-(o-, m- or p-sulfophenyl)amino-6-triazinyl, 2-(1,1 -dimethylhydrazinium)-4-phenylaminotriazin-6-yl, 2-(1,1-dimethylhydrazinium)-4-(o-, m- or p-sulfophenyl)aminotriazin-6-yl, 2-(2-isopropylidene-1,1-dimethyl)hydrazinium-4-phenylaminotriazin-6-yl, 2-(2-isopropylidene-1,1-dimethyl)-hydrazinium-4-(o-, m- or p-sulfophenyl)aminotriazin-6-yl, 2-N-aminopyrrolidinium- or 2-N-aminopiperidinium-4-phenylaminotriazin-6-yl or -4-(o-, m- or p-sulfophenyl)aminotriazin-6-yl, and also 4-phenylaminotriazin-6-yl and 4-(sulfophenylamino)triazin-6-yl radicals which contain 1,4-bisazabicyclo [2.2.2] octane or 1,2-bisazabicyclo [0.3.3]-octane bonded via a quaternary nitrogen bond in the 2-position, 2-pyridinium-4-phenylaminotriazin-6-yl or 2-pyridinium-4-(o-, m- or p-sulfophenyl)aminotriazin-6-yl as well as the corresponding 2-oniumtriazin-6-yl radicals which are substituted in the 4-position by alkylamino, such as methylamino, ethylamino or β-hydroxyethylamino, alkoxy, such as methoxy or ethoxy, or aryloxy, such as phenoxy, or sulfophenoxy groups.

Particularly interesting fibre-reactive radicals are fluoro-1,3,5-triazine radicals of the formula

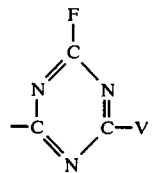

where in particular the following can be used as the substituent V on the triazine ring: —NH$_2$, alkylamino, N,N-dialkylamino, cycloalkylamino, N,N-dicycloalkylamino, aralkylamino and arylamino groups, mixed substituted amino groups, such as N-alkyl-N-cyclohexylamino and N-alkyl-N-arylamino groups, amino groups which contain heterocyclic radicals which can feature further fused-on carbocyclic rings, amino groups in which the amino nitrogen atom is part of a N-heterocyclic ring which can contain further heteroatoms, and hydrazino and semicarbazido. The abovementioned alkyl radicals can be straight-chain or branched and be of low molecular weight or higher molecular weight, preference being given to alkyl radicals having 1 to 6 carbon atoms; suitable cycloalkyl, aralkyl and aryl radicals are in particular cyclohexyl, benzyl, phenethyl, phenyl and naphthyl radicals; heterocyclic radicals are in particular furan, thiophene, pyrazole, pyridine, pyrimidine, quinoline, benzimidazole, benzothiazole and benzoxazole radicals; and amino groups in which the amino nitrogen atom is part of a N-heterocyclic ring are preferably radicals of 6-membered N-heterocyclic compounds which can contain the further heteroatoms nitrogen, oxygen or sulfur. The abovementioned alkyl, cycloalkyl, aralkyl and aryl radicals, the heterocyclic radicals and the N-heterocyclic rings can be further substituted, for example by: halogen, such as fluorine, chlorine and bromine, nitro, cyano, trifluoromethyl, sulfamoyl, carbamoyl, $C_{1-4}$-alkyl, $C_{1-4}$-alkoxy, acylamino groups, such as acetylamino or benzoylamino, ureido, hydroxyl, carboxyl, sulfomethyl or sulfo. Examples of amino groups of this type are: —NH$_2$, methylamino, ethylamino, propylamino, isopropylamino, butylamino, hexylamino, β-methoxyethylamino, γ-methoxypropylamino, β-ethoxyethylamino, N,N-dimethylamino, N,N-diethylamino, β-chloroethylamino, β-cyanoethylamino, γ-cyanopropylamino, β-carboxyethylamino, sulfomethylamino, β-sulfoethylamino, β-hydroxyethylamino, N,N-di-β-hydroxyethylamino, γ-hydroxypropylamino, benzylamino, phenethylamino, cyclohexylamino, phenylamino, toluidino, xylidino, chloroanilino, anisidino, phenetidino, N-methyl-N-phenylamino, N-ethyl-N-phenylamino, N-β-hydroxyethyl-N-phenylamino, 2-, 3- or 4-sulfoanilino, 2,5-disulfoanilino, 4-sulfomethylanilino, N-sulfomethylanilino, 2-, 3- or 4-carboxyphenylamino, 2- carboxy-5-sulfophenylamino, 2-carboxy-4-sulfophenylamino, 4-sulfonaphth-1-ylamino, 3,6-disulfonaphth-1-ylamino, 3,6,8-trisulfonaphth-1-ylamino, 4,6,8-trisulfonaphth-1-ylamino, 1-sulfonaphth-2-ylamino, 1,5-disulfonaphth-2-ylamino, 6-sulfonaphth-2-ylamino, morpholino, piperidino, piperazino, hydrazino and semicarbazido.

The reactive dyes of the formula (1) can contain up to 6 reactive groups of identical or different types.

The reactive dyes of the formula (1) preferably contain highly reactive radicals X. These are to be understood as meaning radicals X which are more reactive than 2-chloro-1,3,5-triazinyl radicals which are substituted in the 4-position by one of the abovementioned substituents V. Examples of these highly reactive radicals X are: 2-fluoro-4-(V)-triazin-6-yl, where V is one of the substituents given above for V, 2,4-dichlorotriazin-6-yl, 2,4-dichloropyrimidine-5-carbonyl, 5-cyano- or 5-methylsulfonyl-2,4-dichloropyrimidin-6-yl, difluorochloropyrimidinyl, such as 2,4-difluoro-5-chloropyrimidin-6-yl, 2,3-dichloroquinoxaline-6-carbonyl, vinylsulfonyl, β-sulfatoethylsulfonyl, β-thiosulfatoethylsulfonyl, β-acetoxyethylsulfonyl and β-chloroethylsulfonyl.

Particular preference is given to the novel long-shelflife print pastes which contain at least one reactive dye of the formula (2) in which X is a radical of the formula

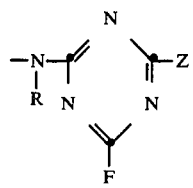
(3)

in which R is hydrogen or $C_{1-4}$-alkyl, such as methyl, ethyl, propyl, isopropyl, butyl, sec.-butyl, isobutyl or tert.-butyl, and Z is a substituted or unsubstituted amino group, or in which X is a difluorochloropyrimidinyl radical bonded via a —N(R)— group or is a vinylsulfonyl, β-sulfatoethylsulfonyl, β-thiosulfatoethylsulfonyl, β-chloroethylsulfonyl or β-acetoxyethylsulfonyl radical which is bonded directly or via an aliphatic bridge member.

The reactive dyes of the formula (1) are derived in particular from the following dyes:

1. Monoazo compounds of the formula

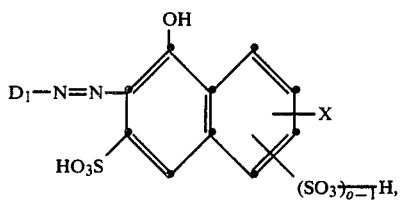
(4)

in which $D_1$ is a radical of the benzene or naphthalene series, for example a phenyl, naphthyl, stilbene, diphenyl, benzothiazolylphenyl or diphenylamine radical which can be substituted by sulfo groups, halogen, for example chlorine, acylamino groups, for example acetylamino or benzoylamino, amino groups, for example —NH$_2$ or methylamino, alkoxy, for example methoxy, hydroxyl, carboxyl or fibre-reactive radicals X, X is preferably bonded to the 5-, 6-, 7- or 8-position of the naphthalene nucleus directly or via an amino group, for example —NH$_2$ or —NHCH$_3$, and is as defined under the formula (1).

2. Disazo compounds of the formula (4) in which $D_1$ is a radical of the azobenzene, azonaphthalene or phenylazonaphthalene series and $D_1$ and the napthalene nucleus can be substituted as indicated in class 1.

3. Disazo compounds of the formula

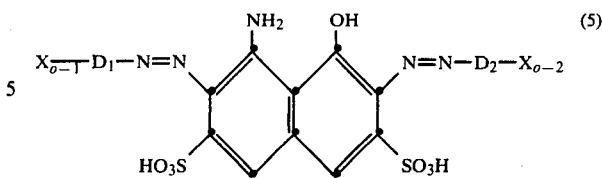
(5)

in which X is as defined under the formula (1) and $D_1$ and $D_2$, independently of each other, are defined in the same way as $D_1$ was under the formula (4).

4. Monoazo compounds of the formula

(6)

in which $D_1$ is a radical indicated under the formula (4), in particular a disulfonaphthyl or stilbene radical, X is as defined under the formuLa (1), and the benzene nucleus can contain further substituents, for example halogen atoms or alkyl, alkoxy, carboxyl, ureido or acylamino groups.

5. Monoazo or disazo compounds of the formula

$$X—D_1—N=N—K_1 \qquad (7)$$

in which $D_1$ is a radical of the azobenzene, azonaphthalene or phenylazonaphthalene series or is preferably a radical of the benzene or naphthalene series which can be substituted by the substituents given for $D_1$ under the formula (4), $K_1$ is the radical of a naphtholsulfonic acid or the radical of a ketomethylene compound, for example an acetoacetarylide, in particular acetoacetanilide, or a 5-pyrazolone, in particular a 1-phenyl-3-methyl-5-pyrazolone, where the OH group is adjacent to the azo group, and X is bonded to $D_1$ directly or via an amino group, for example via —NH$_2$, methylamino or benzoylamino. $D_1$ preferably is a radical of the benzene series which contains a sulfo group.

6. Monoazo or disazo compounds of the formula

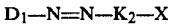
$$D_1—N=N—K_2—X \qquad (8)$$

in which $D_1$ is a radical defined above for $D_1$ in classes 1 and 2, $K_2$ is the radical of an enolisable ketomethylene compound, for example an acetoacetarylide, in particular acetoacetanilide, or a 5-pyrazolone, in particular a 1-phenyl-3-methyl-5-pyrazolone, where the OH group is adjacent to the azo group, and X is as defined in classes 1 to 4.

7. Metal complex compounds, for example copper, chromium and cobalt complexes, of dyes of the formulae (4) to (8) in which $D_1$, $K_1$ and $K_2$ are as defined above and, additionally, contain a metallisable group, for example a hydroxyl, methoxy or carboxyl group, adjacent to the azo group.

8. Anthraquinone compounds which contain the radical X bonded to an alkylamino or arylamino group which is itself bonded to the α-position of the anthraquinone nucleus, in particular anthraquinone compounds of the formula

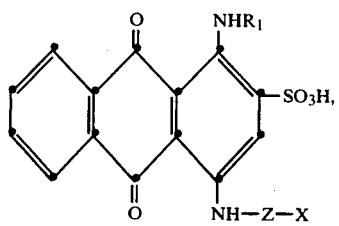

in which $R_1$ is hydrogen, alkyl or aryl, in particular phenyl, and Z is a bridge member which is predominantly a divalent radical of the benzene series, for example a phenylene, diphenylene or 4,4'-stilbene or azobenzene radical. Z should preferably contain a sulfo group for every benzene ring present. The anthraquinone nucleus can additionally contain a sulfo group in the 5-, 6-, 7- or 8-position. The radical X is bonded to Z directly or via an amino group.

9. Phthalocyanine compounds of the formula

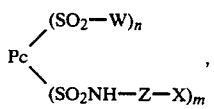

in which Pc is a phthalocyanine nucleus, preferably copper phthalocyanine, W—OH and/or —$NH_2$, Z is a bridge member, preferably an aliphatic, cycloaliphatic or aromatic bridge, and n and m are each 1, 2 or 3 and can be identical or different, provided that n+m is not greater than 4. The phthalocyanine compounds preferably contain a water-solubilising group, for example a sulfo group, and a —Z—N(R)—X group in which R is hydrogen or alkyl and X is as defined under the formula (1).

10. Nitro dyes of the formula

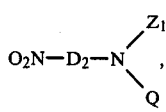

in which $D_2$ is a naphthalene nucleus or benzene nucleus which can be further substituted, the nitrogen atom N is in the o-position relative to the nitro group, $Z_1$ is hydrogen or a substituted or unsubstituted hydrocarbon radical and Q is hydrogen or an organic radical which is bonded to the nitrogen through a carbon atom, and in which Q and $Z_1$ are not both hydrogen, and Q can be bonded to $Z_1$ if $Z_1$ is a hydrocarbon radical or to $D_2$ in the ortho-position relative to the nitrogen atom N to form a heterocyclic ring, and which contain at least one radical X, in particular a —N(R)—X radical in which R is hydrogen or alkyl and X is as defined under the formula (1); in particular nitro dyes of the formula

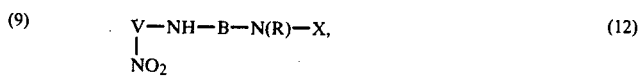

in which V and B are each monocyclic aryl nuclei and the nitro group in V is in the o-position relative to the —NH group.

11. Metal complexes of formazan dyes of the formula

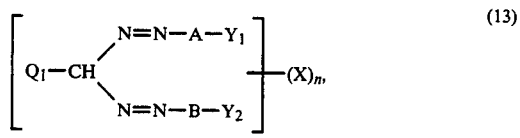

in which $Q_1$ is an organic radical or a nitro or cyano group, A and B are each radicals of diazo components of the benzene, naphthalene or heterocyclic series, and $Y_1$ and $Y_2$ are both substituents which are bonded in the o-position relative to the azo group and are capable of complexing with a heavy metal, X is as defined under the formula (1), and n is 1 or 2.

The radical $Q_1$ is in particular a radical of the benzene series, for example phenyl or sulfophenyl, or an alkyl radical, for example methyl, a low molecular weight alkanoyl group, for example acetyl, a carbalkoxy group having up to 4 carbon atoms, a benzoyl group or a heterocyclic radical, and A and B are each preferably sulfo-, sulfonamido- or alkylsulfonyl-substituted phenyl radicals. $Y_1$ and $Y_2$ are each in particular OH and COOH groups. Suitable heavy metals are copper, chromium, cobalt and nickel.

12. Dioxazines of the formula

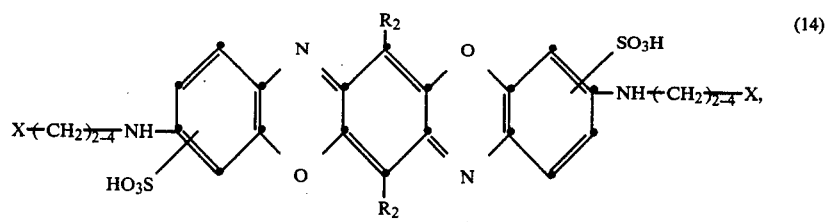

in which $R_2$ is $C_{1-4}$-alkyl, for example methyl, or halogen, for example chlorine, and X is as defined under the formula (1).

Very particular preference is given to long-shelflife print pastes which contain a reactive dye of the formula

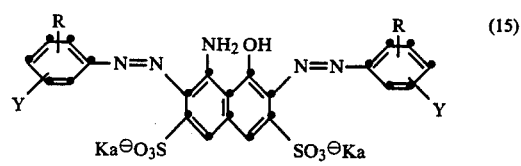

in which one Y is a 2-fluoro-4-(Z)-1,3,5-triazinyl-6-amino radical in which Z is a substituted or unsubstituted amino group, in particular one of the radicals denoted by V, or a β-sulfatoethylsulfonyl radical, and the other Y is a β-sulfatoethylsulfonyl radical or —$SO_3^\ominus Ka$, one R is hydrogen and the other R is hydrogen or —$SO_3^\ominus Ka$, and Ka is a cation, a sodium alginate thickening and for each fibre-reactive leaving group or for each activated double bond at least 3 times the stoichiometric amount of sodium acetate plus water and can, if desired, also contain oxidising agents.

The cation Ka in the formulae (2) and (15) is a hydrogen, sodium, potassium, lithium or ammonium ion or the cation of an organic amine, for example of triethanolamine.

The print pastes according to the invention are distinguished from existing print pastes containing sodium hydrogencarbonate as fixing alkali by a much longer shelflife.

The following examples serve to illustrate the invention. The parts and percentages are by weight. The temperatures are given in degrees centigrade. Parts by weight relate to parts by volume as the gramme relates to the cubic centimetre.

EXAMPLE 1

Print paste A 2.5 parts of the reactive dye of the formula obtained on printing with the print paste containing sodium acetate as fixing alkali (print paste A) and, as a comparison, with the print paste containing equimolar amounts of sodium hydrogencarbonate as fixing alkali (print paste B) a mercerised cotton fabric (application level: 900 g of paste per kilo of substrate), after the print paste has been stored at 42° C. for the indicated period, drying the resulting printed fabric at 120° C. for 2 minutes, and then steaming it at 103° C. in saturated steam for 8 minutes.

TABLE 1

| Storage time | Degree of fixation | |
|---|---|---|
| (at 42° C.) | Print paste A | Print paste B |
| at once | 76% | 74% |
| 1 day | 76% | 73% |
| 3 days | 74% | 70% |
| 7 days | 72% | 62% |
| 15 days | 71% | 55% |
| 21 days | 70% | 50% |
| 28 days | 67% | 43% |
| 36 days | 64% | 38% |
| 42 days | 63% | 34% |
| 49 days | 59% | 27% |

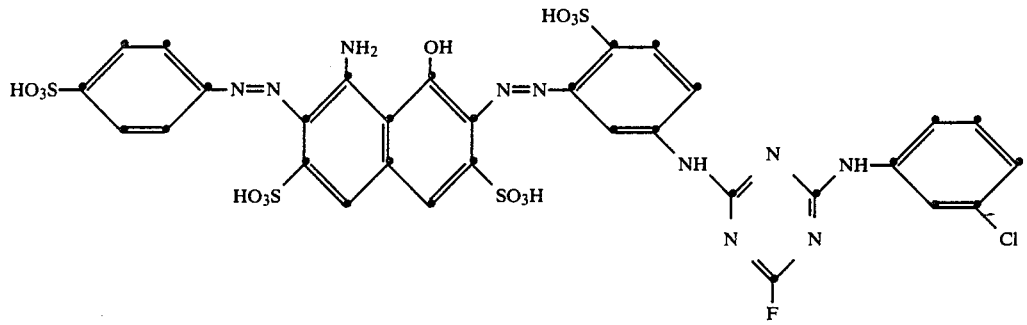

having an active substance content of 69 percent are sprinkled with high-speed stirring into 97.5 parts of a stock thickening containing 50 parts of 5 percent sodium alginate thickening, 44.4 parts of water, 2 parts of sodium acetate (×3 H₂O), 1 part of sodium m-nitrobenzenesulfonate and 0.1 part of 40 percent aqueous formaldehyde solution.

EXAMPLE 2

Print paste A

4 Parts of the reactive dye of the formula

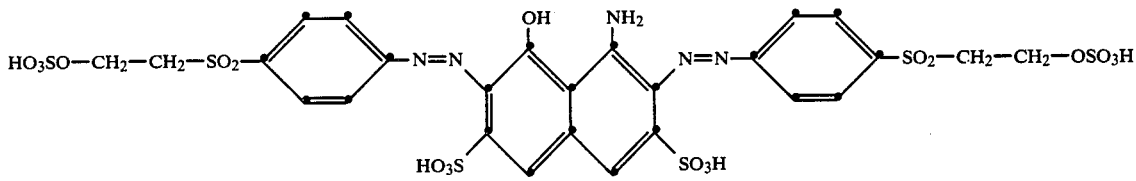

Print paste B

The same ingredients as in print paste A are used, except that the 2 parts of sodium acetate (×3 H₂O) are replaced by 1.2 parts of sodium hydrogencarbonate and 45.2 parts of water are added instead of 44.4 parts of water.

The print pastes thus obtained are used to print a mercerised cotton fabric, and the printed fabric is dried and steamed at 103° C. in saturated steam for 8 minutes. The printed fabric is then rinsed, if desired soaped at the boil and rinsed once more, and then dried.

To document the improved print paste stability, Table 1 shows the degrees of fixation (calculated from the extinctions (at λmax.) of extraction solutions of fixed and unfixed prints which have not been washed off)

having an active substance content of 62 percent are sprinkled with high-speed stirring into 96 parts of a stock thickening containing 50 parts of 5 percent sodium alginate thickening, 40.9 parts of water, 4 parts of sodium acetate (×3 H₂O), 1 part of sodium m-nitrobenzenesulfonate and 0.1 part of 40 percent aqueous formaldehyde solution.

Print paste B

The same ingredients as in print paste A are used, except that the 4 parts of sodium acetate (×3 H₂O) are replaced by 2.5 parts of sodium hydrogencarbonate and 42.4 parts of water are added instead of 40.9 parts of water.

The print pastes thus obtained are used to print a mercerised cotton fabric, and the printed fabric is dried and steamed at 103° C. in saturated steam for 8 minutes. The printed fabric is then rinsed and subsequently dried.

To document the improved print paste stability, Example 1 is repeated, giving the degrees of fixation shown in Table 2.

TABLE 2

| Storage time | Degree of fixation | |
| (at 42° C.) | Print paste A | Print paste B |
| --- | --- | --- |
| at once | 95% | 91% |
| 1 day | 95% | 90% |
| 3 days | 95% | 86% |
| 7 days | 93% | 64% |
| 15 days | 94% | 57% |
| 21 days | 94% | 52% |
| 28 days | 94% | 50% |
| 36 days | 93% | 46% |
| 42 days | 93% | 47% |
| 49 days | 93% | 47% |
| 56 days | 92% | 44% |
| 63 days | 92% | 44% |
| 70 days | 91% | 36% |

The above Example is repeated, except that the amount of sodium acetate (×3 H$_2$O) in print paste A is reduced to 2 parts, and 10 parts of the indicated reactive dye are used, producing a ratio of fixing alkali to reactive dye as indicated in Example 3 of German Auslegeschrift No. 1,916,627 and affording, on the mercerised cotton fabric after steaming at 103° C. in saturated steam for 8 minutes, a degree of fixation of about 20% and after steaming at 112° C. under 0.5 atmosphere gauge in a star ager for 20 minutes in accordance with Example 3 of said German Auslegeschrift a degree of fixation of about 75%. By comparison, the print paste used in the above Example, which contains a higher amount of sodium acetate, produces a distinctly higher degree of fixation (95%).

Example 2 is repeated, except that the 4 parts of the reactive dye indicated there are replaced by 4 parts of one of the reactive dyes indicated hereafter, affording with sodium acetate used as fixing alkali similar advantages as those indicated in Example 2:

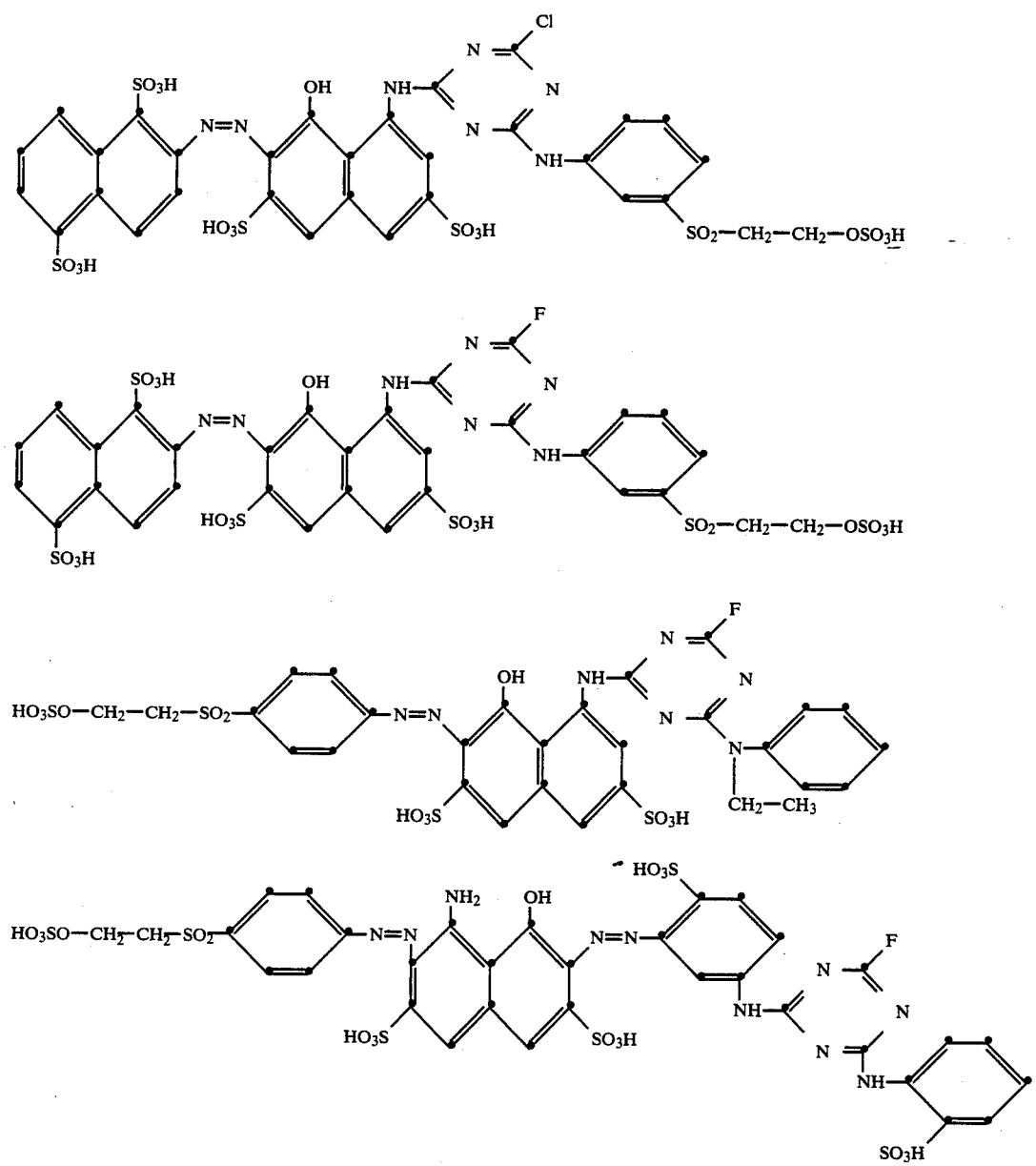

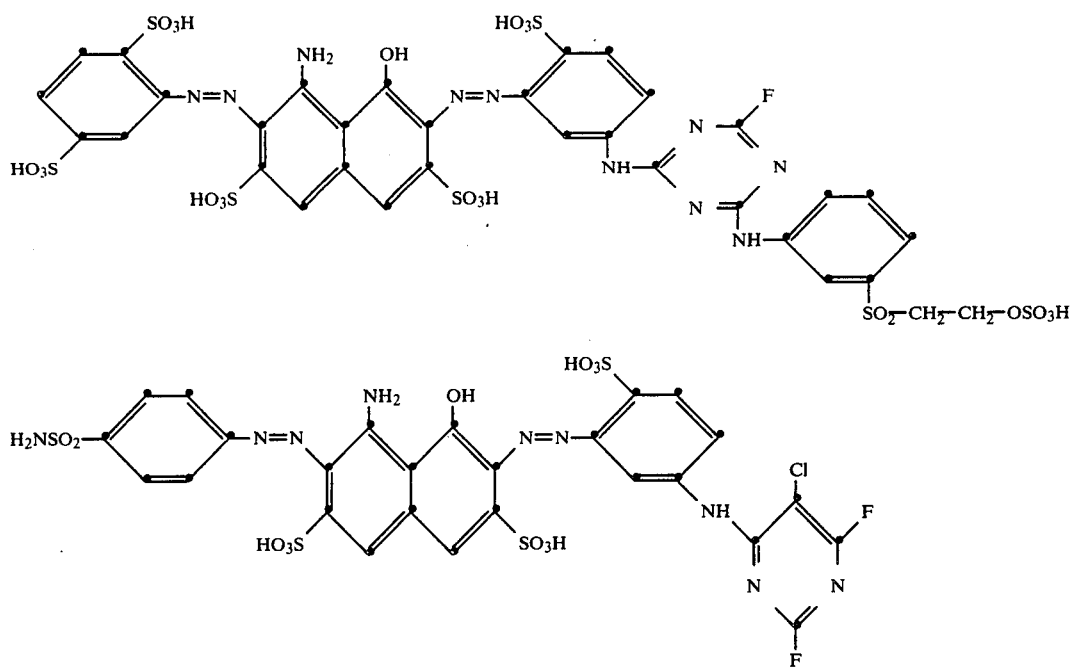

EXAMPLE 3

Print paste A 2.5 parts of the reactive dye of the formula

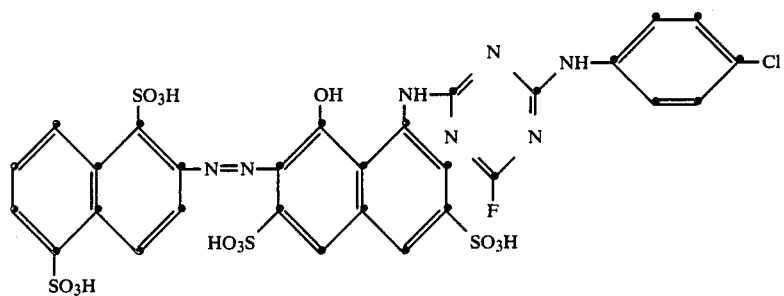

having an active substance content of 60 percent are sprinkled with high-speed stirring into 97.5 parts of a stock thickening containing 50 parts of 5 percent sodium alginate thickening, 44.8 parts of water, 1.6 parts of sodium acetate ($\times 3$ H$_2$O), 1 part of sodium m-nitrobenzenesulfonate and 0.1 part of 40 percent aqueous formaldehyde solution.

Print paste B

The same ingredients as in print paste A are used, except that the 1.6 parts of sodium acetate ($\times 3$ H$_2$O) are replaced by 1 part of sodium hydrogencarbonate and 45.4 parts of water are added instead of 44.8 parts of water.

The print pastes thus obtained are used to print a mercerised cotton fabric, and the printed fabric is dried and steamed at 103° C. in saturated steam for 8 minutes. The printed fabric is then rinsed and subsequently dried.

To document the improved print paste stability Example 1 is repeated, except that the print pastes are stored at 20° C. and not at 42° C., affording the degrees of fixation shown in Table 3.

TABLE 3

| Storage time | Degree of fixation | |
| (at 20° C.) | Print paste A | Print paste B |
| --- | --- | --- |
| at once | 72% | 68% |
| 3 days | 72% | 68% |
| 7 days | 72% | 67% |
| 14 days | 71% | 66% |
| 21 days | 71% | 66% |
| 28 days | 70% | 62% |
| 35 days | 69% | 60% |
| 42 days | 68% | 58% |
| 49 days | 68% | 56% |
| 56 days | 67% | 54% |
| 81 days | 64% | 47% |

We claim:

1. A long-shelflife alkaline urea free print paste consisting essentailly of at least one water-soluble reactive dye of the formula $$D-(X)_m \qquad (1),$$

in which D is the radical of an organic dye of the monoazo, polyazo, metal complex azo, anthraquinone, phthalocyanine, formazan, azomethine, nitroaryl, dioxazine, phenazine or stilbene series, X is a fibre-reactive radical of the aliphatic, aromatic or heterocyclic series which is bonded to the radical D either directly or via a bridge member, and m is 1, 2, 3, 4, 5 or 6, and, per fibre-reactive radical X, two times to six twice the stoichiometric amount of an alkali metal acetate.

2. A long-shelflife print paste according to claim 1 which contains, per fibre-reactive radical X, three times to six times the stoichiometric amount of alkali metal acetate.

3. A long-shelflife print paste according to claim 1 in which the alkali metal acetate is potassium acetate or sodium acetate.

4. A long-shelflife print paste according to claim 1 which contains at least one water-soluble reactive dye of the formula $$D-(X)_m-(SO_3^{\ominus}Ka)_n \qquad (2)$$

in which D is the radical of a monoazo or disazo dye or of a metal complex azo, anthraquinone, formazan or dioxazine dye, Ka is a cation, n is 1, 2, 3, 4, 5 or 6, and X and m are as defined in claim 1.

5. A long-shelflife print paste according to claim 4 which contains at least one reactive dye of the formula (2) in which X is a radical of the formula

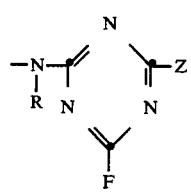

(3)

in which R is hydrogen or $C_{1-4}$-alkyl and Z is a substituted or unsubstituted amino group, or in which X is a difluorochloropyrimidinyl radical bonded via a —N(-R)—group or is a vinylsulfonyl, β-sulfatoethyl-sulfonyl, β-thiosulfatoethylsulfonyl, β-chloroethylsulfonyl or β-acetoxyethylsulfonyl radical which is bonded directly or via an aliphatic bridge member.

6. A long-shelflife print paste according to claim 4 in which m is 1 or 2.

7. A long-shelflife print paste according to claim 4 in which n is 2, 3 or 4.

8. A long-shelflife print paste according to claim 1 which contains alginates or emulsions as thickening agents.

9. A long-shelflife print paste according to claim 1 which contains, per fibre-reactive radical X, twice to five times the stoichiometric amount of alkali metal acetate.

10. A long-shelflife print paste according to claim 1 which contains as further additive ε-caprolactam, thiodiethylene glycol, polyethylene glycol, pentaerythritol, acetin or dicyanodiamide.

11. A long-shelflife print paste according to claim 3 in which the alkali metal acetate is sodium acetate.

12. A long-shelflife print paste according to claim 9 which contains, per fibre-reactive radical X, three times to five times the stoichiometric amount of alkali metal acetate.

13. A long-shelflife print paste according to claim 12 in which the alkali metal acetate is potassium acetate or sodium acetate.

14. A process for printing cellulosic fibres, which comprises applying to said fibres a long-shelflife urea alkaline print paste consisting essentially of at least one water-soluble reactive dye of the formula $$D-(X)_m$$

in which D is the radical of an organic dye of the monoazo, polyazo, metal complex azo, anthrquinone, phthalocyanine, formazane, azomethine, nitroaryl, dioxazine, phenazine or stilbene series, X is a fibre-reactive radical of the aliphatic, aromatic or heterocyclic series which is bonded to the radical D either directly or via a bridge member, and m is 1, 2, 3, 4, 5 or 6, and, per fibre-reactive radical X, two times to six times the stoichiometric amount of an alkali metal acetate; and then fixing the reactive dye.

15. A process according to claim 14 wherein the reactive dye is fixed at a temperature of 100° C. to 140° C. with steam in the course of 30 seconds to 12 minutes.

16. A process according to claim 15 wherein the reactive dye is fixed in the course of 2 to 10 minutes.

* * * * *